July 17, 1962 J. S. KIRKPATRICK ET AL 3,044,166
METHOD FOR MAKING THIN SPHERICAL SHELLS
Filed March 26, 1958 2 Sheets-Sheet 1

INVENTORS
JAMES S. KIRKPATRICK
FRED E. KRAUSE
BY
Whittemore, Hulbert
& Belknap
ATTORNEYS July 17, 1962  J. S. KIRKPATRICK ET AL  3,044,166
METHOD FOR MAKING THIN SPHERICAL SHELLS
Filed March 26, 1958  2 Sheets-Sheet 2

INVENTORS
JAMES S. KIRKPATRICK
FRED E. KRAUSE
BY
ATTORNEYS

United States Patent Office 3,044,166
Patented July 17, 1962

3,044,166
METHOD FOR MAKING THIN
SPHERICAL SHELLS
James S. Kirkpatrick and Fred E. Krause, Detroit, Mich., assignors to Brooks and Perkins, Inc., Detroit, Mich., a corporation of Delaware
Filed Mar. 26, 1958, Ser. No. 724,194
4 Claims. (Cl. 29—538)

The present invention relates to the manufacture of thin spherical shells of metal produced with extreme accuracy as to shape and also thickness of the shell. The method has been used in the production of the initial earth satellite shells.

Due to the requirement that the material, which in the practical embodiment is essentially magnesium, be formed to substantially exactly hemispherical shape and at the same time the shell have a wall thickness of approximately .028", a new combination of metal forming and machining steps was required.

It is an object of the present invention to produce a spherically formed metal shell of substantially uniform wall thickness by a method which comprises initially forming the inner surface of the shell to exact hemispherical shape within the required limits, and thereafter supporting the shell by its accurately finished interior surface while machining its outer surface.

More specifically, it is an object of the present invention to produce the shell as described in the preceding paragraph in which the inner hemispherically formed surface is produced by spinning against a master mandrel, and in which the outer surface is machined by a turning operation.

It is a further object of the present invention to produce a hemispherically formed shell member by an operation which includes forming its inner surface to substantially exact hemispherical formation by spinning over a master mandrel, thereafter shrinking the hemispherical shell onto a second hemispherical master mandrel, and finally machining the outer surface of the shell by a turning operation in which the second master mandrel is rotated on an axis diametral with respect to it, and in which a turning tool is moved in an arcuate path about an axis intersecting the center of the second spherical master mandrel.

Other objects and features of the invention will become apparent as the description proceeds, especially when taken in conjunction with the accompanying drawings, illustrating a preferred embodiment of the invention, wherein.

Figure 1:
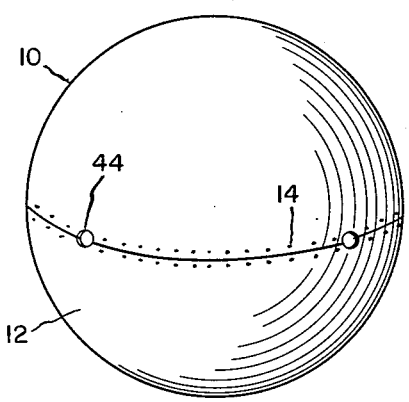
FIGURE 1 is an elevational view of the completed satellite shell showing the two generally hemispherical portions assembled together.

The completed satellite shell comprises two generally hemispherical shell portions 10 and 12 which are interconnected along a major diameter of the shell by suitable means which in practice have been very small jewelers' screws indicated at 14 which pass through the edge portions of the hemispherical shells into an annular channel formed from sheet magnesium.

The production of the shell starts with a flat sheet of magnesium which is cut to circular form and which was in a practical operation approximately .090" thick. The material was an alloy consisting of 96% magnesium, 3% aluminum, and 1% zinc. The drawing operation performed as indicated in FIGURE 2 was carried out with the magnesium disc heated to approximately 650 degrees Fahrenheit.

Figure 2:
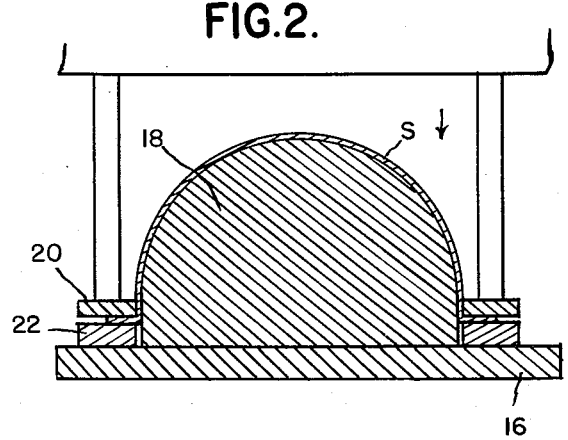
FIGURE 2 is a diagrammatic view of the deep drawing device used for forming the flat sheet into generally hemispherical shape of approximately the required size.

As seen in FIGURE 2, the apparatus for the purpose comprises a lower member 16 which has an upwardly extending hemispherically formed cast iron punch 18. The hemispherical punch 18 is somewhat larger than the final size of satellite shell desired. The circular blank of magnesium is supported between draw rings indicated at 20 and 22 which are moved downwardly over the punch and by a deep draw operation causes the magnesium disc to assume a substantially hemispherical central form. The punch 18 during this operation is lubricated with colloidal graphite.

Figure 3:
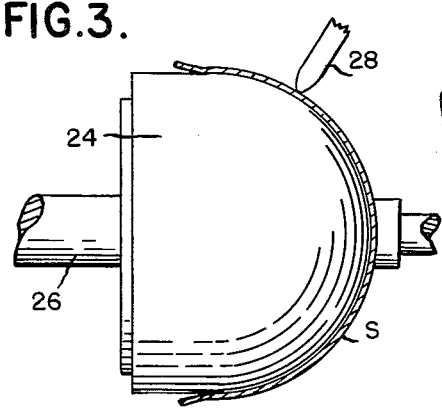
FIGURE 3 is a view of the shell on a master mandrel during the spinning operation.
Figure 4:
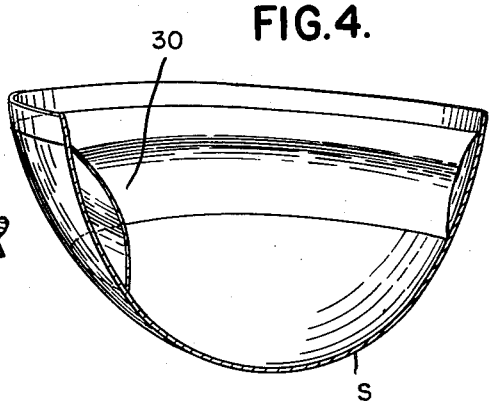
FIGURE 4 is a fragmentary perspective view of a hemispherical shell with the internal ring welded in place.
Figure 5:
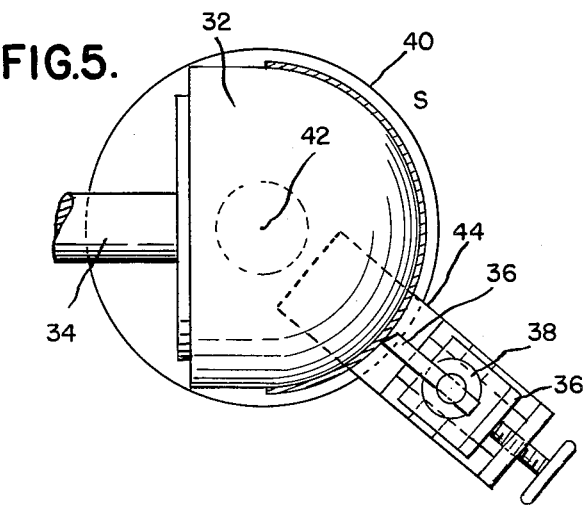
FIGURE 5 is a plan view of the shell shrunk onto a master mandrel for final machining by turning.
Figure 6:
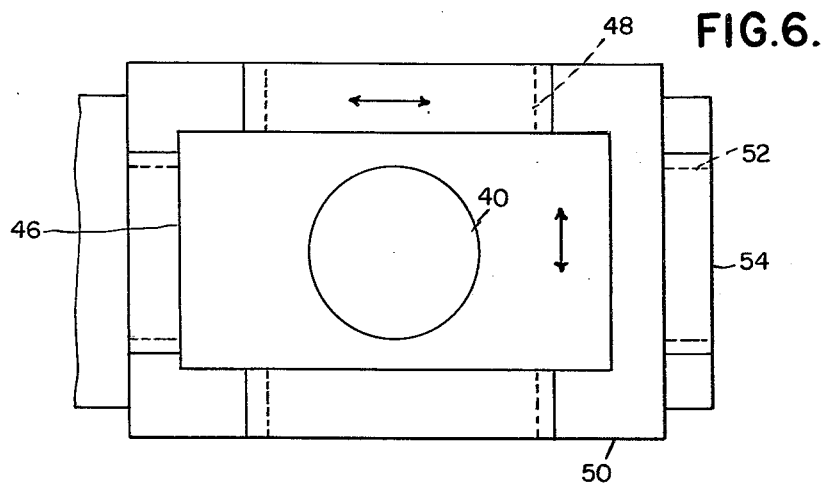
FIGURE 6 is a plan view of the adjustable support mechanism for the turning tool.

Following the initial deep draw operation of the magnesium sheet to generally hemispherical form it is next placed on a master mandrel 24 carried at one end of an arbor 26 adapted to drive the mandrel in rotation. Preferably, the central portion of the shell which is here designated at S, is engaged by a live center shaped to conform to the hemispherical configuration of the shell. The master mandrel 24 is rotated and the shell is spun to conform exactly to the configuration of the mandrel and hence, its interior surface becomes exactly hemispherical with the same accuracy as that provided on the master mandrel 24. This accuracy of course may be as high as desired. The spinning operation is carried out by any conventional spinning tool, a portion of such tool being indicated at 28 in FIGURE 3.

Preferably, the master mandrel 24 is formed of cast iron machined to the accuracy required and is heated, as for example by an acetylene torch prior to the spinning operation to approximately 600 degrees Fahrenheit, which temperature prevails during the spinning operation.

It will be appreciated that at this time the inner surface of the shell has been caused to assume an extremely accurate hemispherical shape. However, the wall thickness of the magnesium, particularly since it has been deep drawn, may be substantially variable and accordingly, its outer surface if measured accurately for deviation from hemispherical shape, would show considerable inaccuracy.

Following the spinning operation a ring or "doughnut" 30 of thin magnesium sheet material curved to be outwardly concave, is welded to the interior of the hemispherical shell. This operation is required in the production of an earth satellite, but of course is not an essential operation to the production of thin walled metal hemispherical or spherical shells intended for other purposes.

In the actual production of the earth satellite shell however, the ring is molded in shape after which the hemisphere is placed in an oven and heated briefly to anneal or relieve any stresses which may have been set up by the welding.

As the next operation the hemispherical shell with its interior surface accurately formed within the required limits to exact hemispherical shape is shrunk onto a very exact cast iron machined block the exterior surface of which is finished to the required accuracy and is therefore adapted to engage the inner surface of the shell and to support it for subsequent operations. Where the reinforcing ring 30 is provided, it is appreciated that the machined block will be recessed to accommodate this ring and will therefore be able to engage the inner surface of the shell only throughout zones not covered by the ring 30. The final machining operation is carried out by a machine in which the cast iron block indicated at 32, is rotated by a mandrel 34 while the shell S is tightly conformed thereto by the shrink fit. A turning tool 36 is provided in a holder 38 which is mounted on a rotatable plate 40 the axis of which is perpendicular to and intersects the axis of the machined block 32. Accordingly, as the plate 40 is rotated about its axis, whose location is designated at 42, while the block 32 is rotated on its axis, it will be appreciated that the outside surface of the shell S is machined to an exact hemispherical shape. Since the inner surface had previously been formed to an exact hemispherical shape, this final machining operation will remove different thicknesses of material as required to produce substantially uniform shell thickness throughout.

Since it is of course essential that the axis about which the turning tool 36 rotates shall intersect the axis of the hemispherically formed block 32, the turning tool is mounted on a bracket 44 carried by the plate 40 which in turn is mounted on a slide 46 movable on ways indicated at 48 provided on an intermediate slide 50, which in turn is movable upon longitudinally extending ways 52 provided on the stationary bed 54. Accordingly, the rotatable plate 40 may be adjusted until its vertical axis intersects the axis of the hemispherical supporting block 32. Suitable means including an adjustable slide 56 are provided for effecting adjustment of the tool holder 38 to control the depth of cut.

Figure 7:
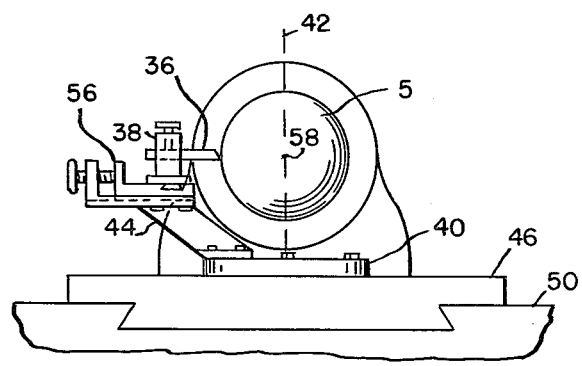
FIGURE 7 is an end view of the mechanism of FIGURE 5 with the turning tool in a different position.

As best seen in FIGURE 7, the axis of adjustment of the rotary tool support 50 is indicated by the broken line designated 42 which passes through the center of the hemispherical shell S and supporting mandrel 32. It will also be observed in this FIGURE that the location of the turning tool 36 is at a point spaced ninety degrees from the point of intersection of the axis 42 and the surface of the shell. Thus, as the support 40 is rotated about the vertical axis 42, the point of the tool 36 describes an arc concentric with the center 58 of the shell and this combined with the rotation of the shell generates the true hemispherical exterior surface required.

The completed shell is produced by assembling two of the hemispheres together over a supporting frame work having arms connected to the shell at the zones designated 44 in FIGURE 1 and the parts are retained in assembled relation by the screws 14 previously described.

Briefly reviewed, the complete method is based upon awareness that the sheet magnesium, particularly after the initial deep draw, will unquestionably have variations in thickness greater than allowed in the final product. The initial thickness of the magnesium disc is of course selected to provide excess material for the final machining operation. The deep draw operation produces a generally hemispherical shell and thereafter the spinning operation brings the interior of the shell to approximately exact size and hemispherical configuration. It however, does not produce uniform shell thickness. Thereafter, with the interior surface of the shell used as the primary supporting surface, the shell is shrunk onto a master mandrel and the final operation is a machining operation in which the shell is rotated while its outer surface is turned to hemispherical configuration by a turning tool swung in an arc about an axis which is perpendicular to and intersects the axis of the master mandrel and hence, the axis of the inner hemispherical surface of the shell. This machining operation produces an accurately formed hemispherical exterior surface concentric with the accurately formed hemispherical internal surface and hence, necessarily results in uniform wall thickness. It may be mentioned that the thickness of the shell in one embodiment of the invention was only .028". This is mentioned because of the importance of supporting the interior surface of the shell adequately during the final turning operation.

Following the turning operation it will of course be appreciated that the surfaces of the shell may be buffed and polished as required, and in the production of the earth satellite shells all parts of the shells were given a copper flash, copper plating, silver plating, and then gold plating. The plated surfaces were repolished between each plating operation. A final chromium plating covered by a transparent silicon monoxide coating, an extremely thin film of vaporized aluminum, and a final coating of silicon monoxide were added.

While the invention has been described in connection with a process employing a particular magnesium alloy, it will of course be apparent that the process is applicable to the production parts other than hemispherical in shape and of materials other than magnesium and magnesium alloys. The process is particularly applicable however, to light metals such as aluminum, magnesium, and the like.

The drawings and the foregoing specification constitute a description of the improved method and apparatus for making thin spherical shells in such full, clear, concise and exact terms as to enable any person skilled in the art to practice the invention, the scope of which is indicated by the appended claims.

What we claim as our invention is:

1. The method of forming a thin hemispherically formed metal shell of substantially uniform thickness of only a few thousandths of an inch, which comprises drawing flat stock to form a substantially hemispherical shell, thereafter spinning the drawn shell onto a master mandrel having accurately formed hemispherical exterior surfaces, and finally, machining the shell in a turning operation while supported on a rotating master mandrel having accurate hemispherically formed external surfaces engaging and supporting the internal surfaces of the shell.

2. The method as defined in claim 1 which comprises the steps of removing the spun shell from the mandrel on which it was spun, and shrinking it onto the second mandrel on which it is rotated for the final machining operation.

3. The method of forming an extremely thin uniform walled generally hemispherical shell of a light metal having a wall thickness of only a few thousandths of an inch, which comprises drawing a thin flat sheet of the material to form an approximate hemispherical shell, thereafter spinning the shell onto an accurately formed hemispherical mandrel to cause the interior surface of the shell to assume an accurate hemispherical shape, and finally, turning the shell while rotated on its axis and while supported on a rotating mandrel having an exterior accurately formed hemispherical support surface to produce an accurately shaped hemispherical exterior surface concentric with the accurately formed internal hemispherical surface and thereby to insure substantial uniformity of wall thickness.

4. The method of forming an extremely thin uniform walled generally hemispherical shell of a light metal having a wall thickness of only a few thousandths of an inch, which comprises drawing a thin flat sheet of the material to form an approximate hemispherical shell and which as a result of said drawing has a variable wall thickness, thereafter spinning the shell onto an accurately formed hemispherical mandrel to cause the interior surface of the shell to assume an accurate hemispherical shape, then shrinking said shell onto a rotary master hemispherical mandrel having its exterior surface shaped with the required accuracy to the required internal dimension of the shell, rotating said master mandrel on an axis coincident with the center of curvature thereof, and turning the shell to produce an exterior hemispherical surface shaped with required accuracy to the required external dimension of the shell and thereby insuring substantial uniformity of wall thickness.

References Cited in the file of this patent

UNITED STATES PATENTS

| | | |
|---|---|---|
| 926,898 | Rockwell | July 6, 1909 |
| 1,698,262 | Fine | Jan. 8, 1929 |
| 1,966,713 | Flint | July 17, 1934 |
| 1,987,718 | Smith | Jan. 15, 1935 |
| 2,237,744 | Mullen | Apr. 8, 1941 |
| 2,302,229 | Lampton | Nov. 17, 1942 |
| 2,402,070 | Mudica | June 11, 1946 |
| 2,574,240 | Blackington | Nov. 6, 1951 |

FOREIGN PATENTS

| | | |
|---|---|---|
| 550,126 | Great Britain | Dec. 23, 1942 |